(12) United States Patent
Tsuruoka et al.

(10) Patent No.: US 7,077,003 B2
(45) Date of Patent: Jul. 18, 2006

(54) LIQUID LEVEL SENSOR SWITCH

(75) Inventors: Hiroyuki Tsuruoka, Wako (JP);
Sadayoshi Oshima, Wako (JP); Yuich Auchi, Wako (JP)

(73) Assignee: Toyo Denso Kabushiki Kaisha (JP)

( * ) Notice: Subject to any disclaimer, the term of this patent is extended or adjusted under 35 U.S.C. 154(b) by 0 days.

(21) Appl. No.: 11/073,287

(22) Filed: Mar. 4, 2005

(65) Prior Publication Data
US 2005/0193813 A1 Sep. 8, 2005

(30) Foreign Application Priority Data
Mar. 8, 2004 (JP) ............................. 2004-110557

(51) Int. Cl.
*G01F 23/70* (2006.01)
(52) U.S. Cl. ........................................ 73/313; 116/228
(58) Field of Classification Search .................. 73/313; 200/190
See application file for complete search history.

(56) References Cited
FOREIGN PATENT DOCUMENTS
JP         2000-2580       1/2000
JP         2003-184530     7/2003

OTHER PUBLICATIONS
English Language Abstract of JP 2000-2580.
English Language Abstract of JP 2003-184530.

*Primary Examiner*—Hezron Williams
*Assistant Examiner*—Paul M. West
(74) *Attorney, Agent, or Firm*—Fulbright & Jaworski L.L.P.

(57) ABSTRACT

A liquid level sensor-switch capable of effectively reducing variations in levels detected depending on directions in which it is inclined. The sensor-switch has a case, a guide rod formed therein, a float mounted on the guide rod with a clearance and being movable in the vertical direction along the guide rod in the case, an electrode plate attached to the bottom of the float and a pair of terminals disposed on both sides of the guide rod on the inside bottom of the case, wherein the float moves downward as the level of liquid lowers and it detects a specified low level by contacting the electrode plate with the paired terminals to make conductive a circuit formed between the terminals. It is featured by the fact that a pair of protrusions for restricting a biased movement of the float with respect to the guide rod are provided on both sides of the guide rod on the inside bottom of the case in a direction with a specified angle to a direction of arrangement of the paired terminals.

2 Claims, 5 Drawing Sheets

LIQUID LEVEL SENSOR SWITCH

BACKGROUND OF THE INVENTION

The present invention relates to a liquid level sensor-switch for electrically detecting a liquid level being lower than a specified level.

Generally, a liquid level sensor-switch of this type is used, for example, in an engine oil reservoir of a portable power generator, which detects a level lowered to and below a specified level therein.

FIG. 8 is illustrative of a typical construction of a liquid level sensor-switch which is composed of a case 81 having a guide rod 82 formed therein and incorporating a float 83 which is mounted on the guide rod with a radial clearance S and movable vertically along the guide rod and having an electrode plate 84 attached to the bottom thereof. The case 81 is provided at its inner bottom surface with a pair of terminals 85 and 86 disposed symmetrically on both sides of the guide rod. As the level of oil in the case 81 falls, the float 83 moves downward along the guide rod 82. When the level of oil in the case reaches a specified low level, the float 84 puts the electrode plate 84 in contact with the paired terminals 85 and 86 on the inner bottom surface of the case 81, thereby conducting a circuit formed between the terminals for outputting an electric signal detecting the specified level.

The problem to be solved by the present invention is such that, when driving an engine with a portable power generator placed in a state tilted together with the conventional liquid level sensor-switch, the float 83 may be biased with respect to the guide rod 82 as shown in FIG. 9 (tilted in a direction of arrangement of the terminals 85 and 86) or FIG. 10 (tilted in a direction normal to the direction of arrangement of the terminals) due to the existence of clearance S between the guide rod 82 and the float 83, resulting in variations of the liquid level detected in different tilting directions.

To prevent the biased movement of the float 83, it is desirable to reduce the clearance S between the guide rod 82 and the float 83 or a side gap between the case 81 and the float 83. However, the reduction of the clearance S and the side gap may cause inclusion of oil sludge into the clearance S and the side gap, resulting in unstable movement of the float 83. This solution may have limitations.

SUMMARY OF THE INVENTION

Accordingly, it is a main object of the present invention to provide a liquid level sensor-switch comprising a case in which a guide rod is formed at the center thereof, a float is mounted on the guide rod with a clearance allowing it to freely move along the guide rod and provided at its bottom with an electrode plate, and paired terminals are arranged symmetrically on both sides of the guide rod on the inside bottom of the case, wherein, when the level of liquid in the case decreases to a specified lower level, the float falls to put its bottom electrode plate in contact with the paired terminals which in turn conducts with each other for outputting a detection signal of the specified level, and which is featured by the provision of means for reducing variations in levels detected in states of the case tilted in different directions.

In practice, the above-mentioned means for reducing variations is a pair of protrusions which are disposed on both sides of the guide rod on the inside bottom of the case in a direction having a specified angle from a direction of arrangement of the paired terminals on the inside bottom of the case and which restricts the biased movement of the float with respect to the guide rod.

The liquid level sensor-switch according to the present invention is capable of reliably detecting a specified lower level of liquid in its case by contacting the bottom electrode plate with a pair of the terminals on the inside bottom of the case even in a state tilted in a direction having a specified angle from the direction of arrangement of the paired terminals by preventing the possible biased movement of the float with respect to the guide rod by the protrusions formed on the inside bottom of the case, which protrusions can regulate in this case the state of the float substantially in the same manner as that of the float tilted in the direction of arrangement of the paired terminals.

PREFERRED EMBODIMENTS OF THE PRESENT INVENTION

Figure 1:
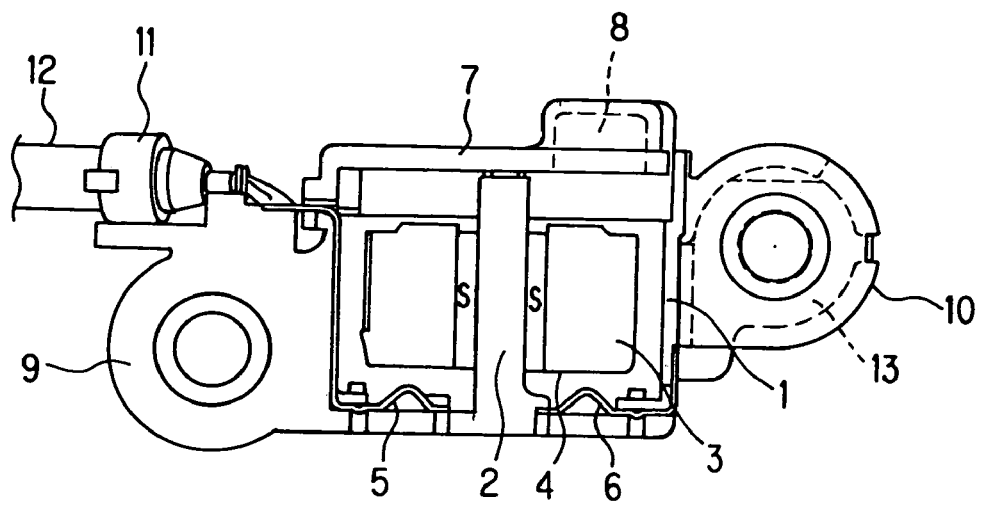
FIG. 1 is a sectional front view of a liquid level sensor-switch according to an embodiment of the present invention.
Figure 2:
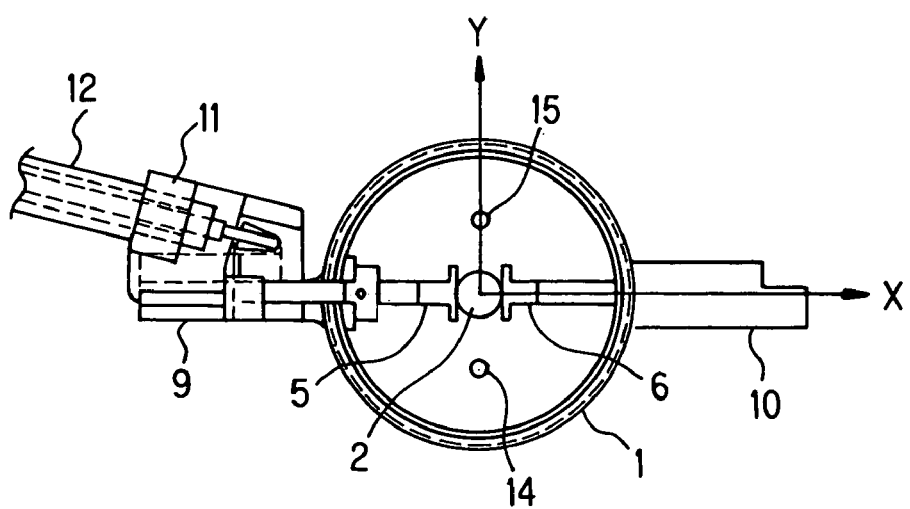
FIG. 2 is a plan view of the liquid level sensor-switch of FIG. 1 with a case cover removed.

In FIGS. 1 and 2, there is illustrated a liquid level sensor-switch according to the present invention, which has a cylindrical case 1 made of insulating synthetic resin, in which an upwardly extending guide rod 2 formed at the center on the inside bottom of the case 1 and a float 3 is mounted on the guide rod with a radial clearance S allowing it to freely move along the guide rod. The float 3 is provided with an electrode plate 4 attached to the bottom thereof and paired terminals 5 and 6 are disposed symmetrically on both sides of the guide rod 2 on the inside bottom of the case 1. The top of the case 1 is covered with a cover 7 having a window 8 for supplying oil into the case 1.

The case 1 has mounting seats 9 and 10 integrally formed on both sides thereof, by which it is mounted for example on an oil reservoir of an engine. The mounting seat 9 is provided with an external terminal 11 (extending from the internal terminal 5) to which a lead wire 12 is connected for outputting a liquid level detecting signal and the mounting seat 10 is provided with an earth terminal 13 (extending from the internal terminal 6).

Figure 3:
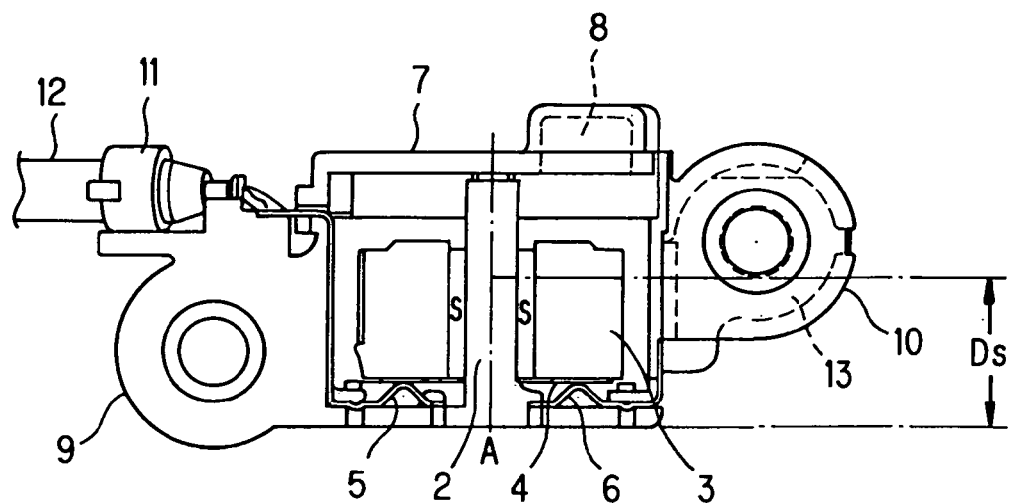
FIG. 3 is a sectional front view showing the ON-state of the liquid level sensor-switch of the embodiment of FIG. 1.

In the thus constructed sensor-switch, as shown in FIG. 3, when the level of oil present in the case 1 lowers to a specified low level, the float 3 moves downward putting its bottom electrode plate 4 in contact with the paired terminals 5 and 6, which in turn conducts to each other to output a detection signal of the specified level of oil in the case 1.

The electrode plate 4 attached to the bottom of the float 3 is plated with gold and the paired terminals 5 and 6 secured to the inside bottom of the case 1 have gold-plated contacting parts so as to be protected against the oxidation of the contacting surfaces to reliably detect the specified low level of oil in the case.

The liquid level sensor-switch according to the present invention is featured by the fact that a pair of protrusions 14 and 15 for restricting the biased movement of the float with respect to the guide rod are formed on the inside bottom of the case in such a manner that they are arranged symmetrically on both sides of the guide rod 2 in the direction Y having a specified angle (90 degrees in the shown case) from the direction X of arrangement of the paired terminals 5 and 6 (see FIG. 2).

Figure 6:
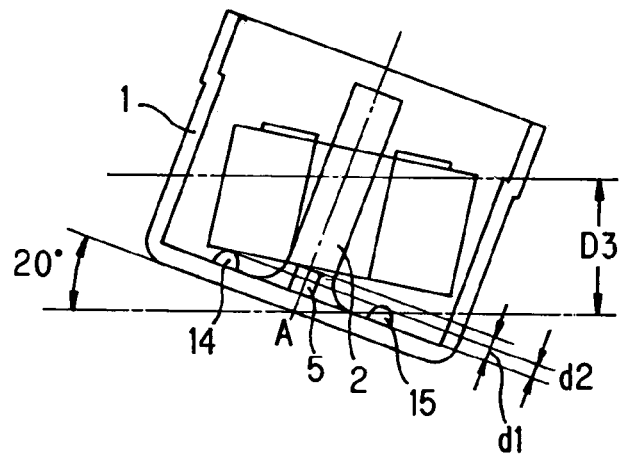
FIG. 6 is a schematic sectional front view of a liquid level sensor-switch having a pair of low protrusions according to the present invention, which is tilted in Y-direction.

These protrusions 14 and 15 are lower in height than the terminals 5 and 6 so as not to prevent the float 3 from making a bridging contact of its bottom electrode plate 4 with the paired terminals 5 and 6 when detecting the specified lower level of liquid in the case (see FIG. 6).

Figure 4:
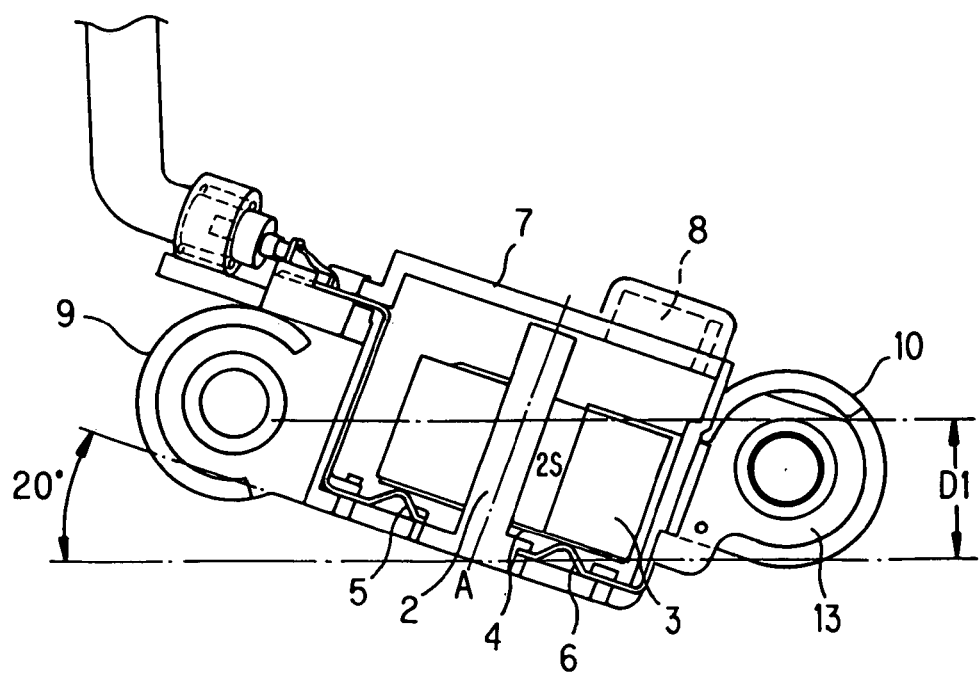
FIG. 4 is a sectional front view of the liquid level sensor-switch of FIG. 1 in a state tilted in X-direction.

As shown in FIG. 3, a liquid level sensor-switch placed on a horizontal plane was turned ON at the liquid level Ds which was determined as a distance of 18 mm from a point A. Next, the sensor-switch was tilted by 20 degrees in a direction X and turned ON at the level DI of 17.002 mm, as shown in FIG. 4.

In the liquid level sensor-switch tilted by 20 degrees in the X-direction with the float 3 contacting its bottom electrode plate 4 with the paired terminals 5 and 6, the float 3 is biased by a gap 2S.

Figure 5:
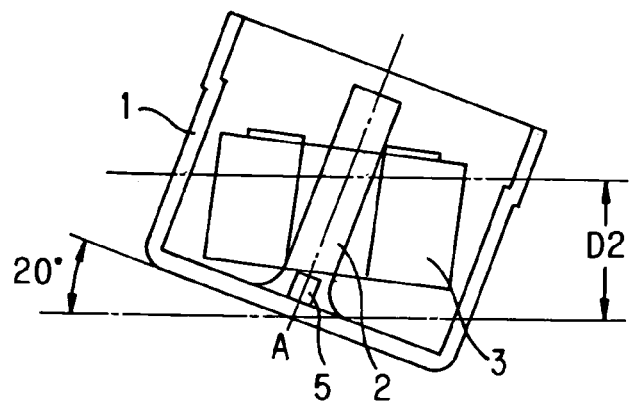
FIG. 5 is a sectional front view of a liquid level sensor-switch having no protrusion in a state tilted in Y-direction.

When the liquid level sensor-switch having no protrusions 14 and 15 was tilted by 20 degrees in the Y-direction, the float 3 was biased with respect to the guide rod as being supported by terminals 5 and 6 and the liquid level at which the switch was turned ON was determined as a distance D2 of 17.526, as shown in FIG. 5. Thus, the liquid levels D1 and D2 detected by the liquid level sensor-switch with no protrusions 14 and 15 in the states tilted in X- and Y-directions indicate a large difference. In contrast, the liquid level sensor-switch which is provided with protrusions (14, 15) each having a height d2 of 1.5 mm and terminals (5, 6) each having a height dl of 2.5 mm as shown in FIG. 6 can restrict the inclination of the float 3 with respect to the guide rod 2 since the float 3 tilted in the Y-direction may abut at one end against one of the protrusions 14 and 15. In this case, a distance D3 at which the sensor-switch was turned ON is 17.265 mm that is closer to the distance Dl obtained as in the state tilted by 20 degrees in the X-direction.

Figure 7:
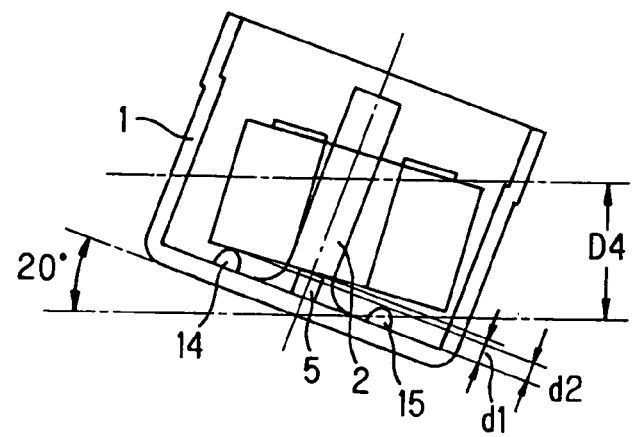
FIG. 7 is a schematic sectional front view of a liquid level sensor-switch having a pair of high protrusions according to the present invention, which is tilted in Y-direction.
Figure 8:
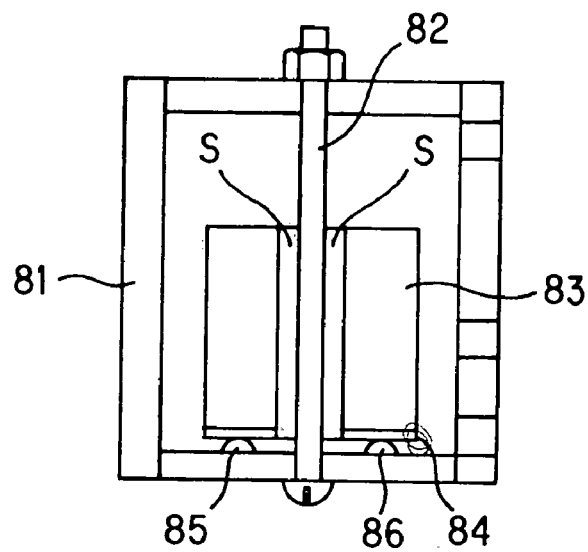
FIG. 8 is a sectional front view of a conventional liquid level sensor-switch.
Figure 9:
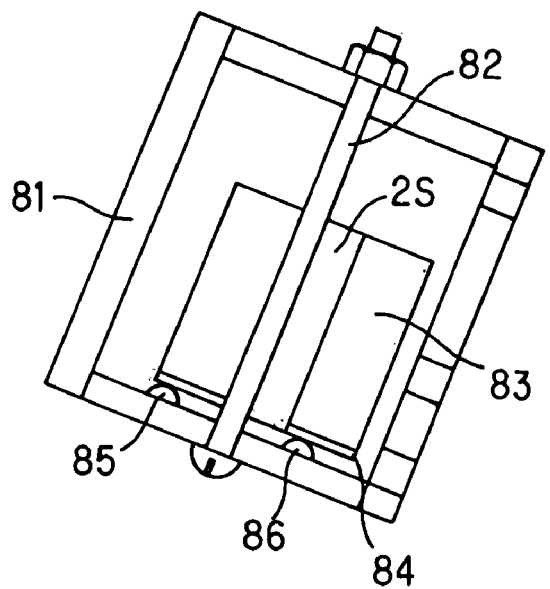
FIG. 9 is a sectional front view of the conventional liquid level sensor-switch of FIG. 8 in a state tilted in X-direction.
Figure 10:
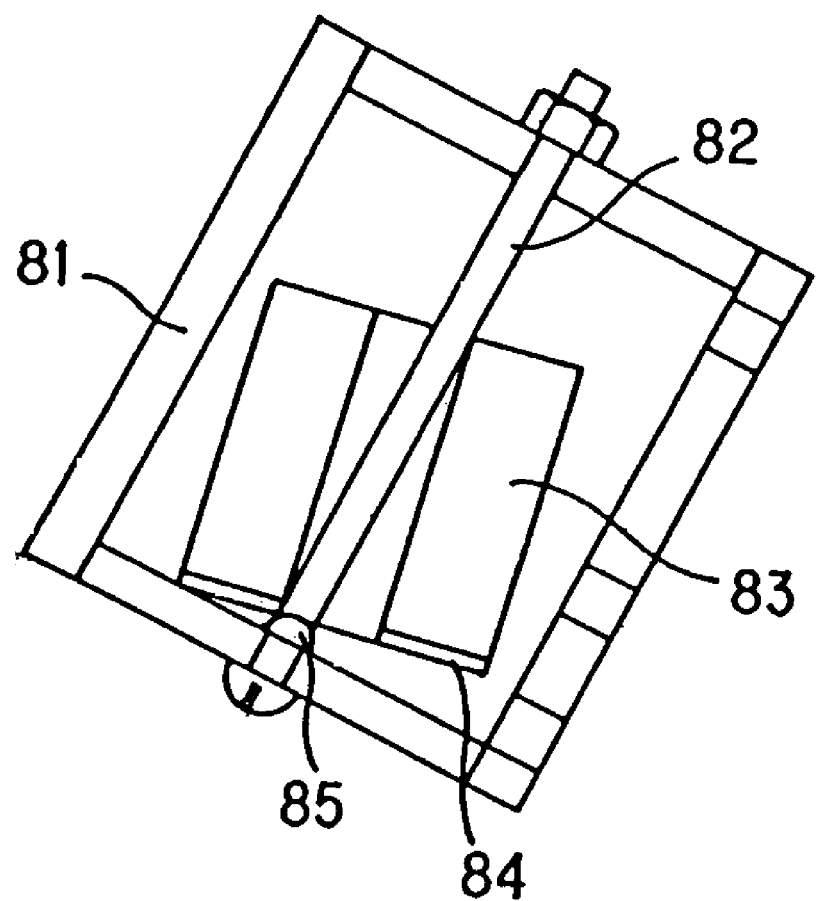
FIG. 10 is a sectional front view of the liquid level sensor-switch of FIG. 8 in a state tilted in Y-direction.

In FIG. 7, there is shown the liquid level sensor-switch provided with protrusions each having a height d2 of 2.0 mm, which is capable of further reducing the inclination of the float 3 with respect to the guide rod 2 when the case of the sensor-switch is tilted by 20 degrees in the Y-direction. In the shown case, the distance D4 at which the sensor switch was turned ON was 17.109 mm which is still closer to the distance D1 of 17.002 mm determined when the sensor-switch being in ON-state with its case tilted by 20 degrees in the X-direction.

When the liquid level sensor-switch is tilted in any direction forming any angle (e.g., 45 degrees) with the direction X, the float 3 may abut at its one end against one of the protrusions (14, 15), whereby its inclination with respect to the guide rod 2 can be reduced so as to effectively reduce variations in detected levels.

INDUSTRIAL APPLICABILITY

According to the present invention, it is possible to provide a liquid level sensor-switch for electrically detecting a specified lower level of liquid in a case in such a manner that a float mounted on a guide rod with a radial clearance moves downward along the guide rod as the liquid level lowers and, at the specified level of liquid in the case, brings an electrode plate attached to the bottom thereof in contact with a pair of terminals provided on the inside bottom of the case to conduct a circuit formed between the paired terminals. The liquid level sensor-switch according to the present invention is featured by the fact that a pair of protrusions for restricting the biased movement of the float with respect to the guide rod are further provided on both sides of the guide rod on the inside bottom of the case in a direction having a specified angle from the direction of arrangement of the paired terminals. This can prevent the occurrence of variations in detecting the specified level of liquid in the case depending on tilting directions of the sensor-switch.

What is claimed is:

1. A liquid level sensor-switch comprising a case, a guide rod formed therein, a float mounted on the guide rod with a clearance and movable in a vertical direction along the guide rod in the case, an electrode plate attached to a bottom of the float and a pair of terminals provided on both sides of the guide rod on an inside bottom of the case, wherein the float moves downward with a decrease in level of liquid and detects a specified level by contacting the electrode plate with the paired terminals and thereby making conductive a circuit formed between the terminals, characterized in that a pair of protrusions for restricting a biased movement of the float with respect to the guide rod are provided one on each side of the guide rod on the inside bottom of the case in a direction with a specified angle to a direction of arrangement of the paired terminals.

2. A liquid level sensor-switch as defined in claim 1, characterized in that the specified angle is 90 degrees.

* * * * *